Figure 1:
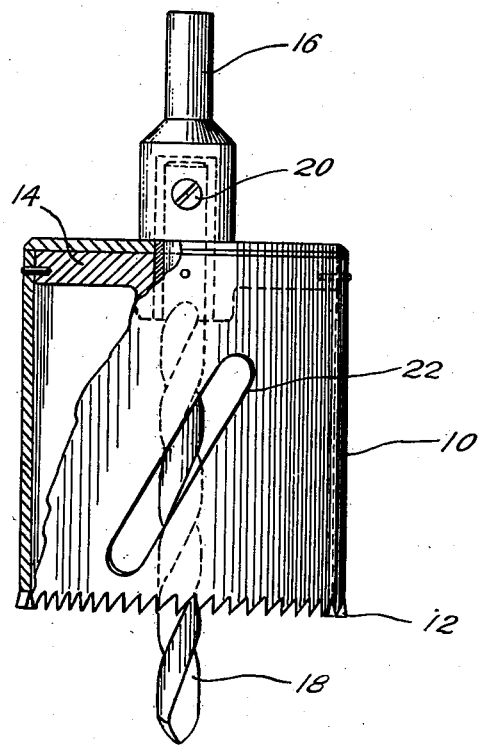

June 14, 1949.   R. M. STARBUCK, JR   2,473,077
TREPANNING TOOL
Filed July 6, 1946

INVENTOR
Robert M. Starbuck, Jr.
BY
Joseph H. Schofield
ATTORNEY

Patented June 14, 1949

2,473,077

UNITED STATES PATENT OFFICE 2,473,077

TREPANNING TOOL

Robert M. Starbuck, Jr., Hartford, Conn.

Application July 6, 1946, Serial No. 681,688

1 Claim. (Cl. 145—120)

This invention relates to trepanning tools and more particularly to a tool of that type adapted to cut a relatively large hole through wood or metal flooring or side walls of a building.

A primary object of the invention is to provide an improved cutting tool of the above type having a continuous circular cutting edge at the end of a hollow cylindrical member, there being helical or inclined slots in the intermediate portions thereof to aid in removal of the cuttings.

Other objects and advantages will be apparent from the specification and claim and from the drawing which illustrates what is now considered to be a preferred embodiment of the invention.

Figure 2:
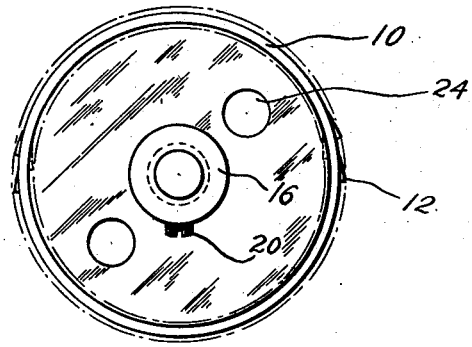

In the drawing:

Figure 1 is a side elevation, partly in section, of a complete tool made according to the present invention, and Fig. 2 is a plan view of the tool shown in Fig. 1.

In its preferred form the invention may include the following principal parts: First, a cylindrical member having cutting teeth extending around its periphery at one end; second, helical or inclined slots formed within the intermediate portion of the cylindrical wall extending approximately to but not intercepting the cutting edge; third, a head portion attached to the cylindrical member at the end opposite the cutting edges to which rotating means may be attached; and fourth, a central axially extending cutting tool within the cylindrical member to act as a pilot and cut a small hole in advance of the annular series of teeth at the end of the cylindrical member.

Referring more in detail to the figures of the drawing, there is shown at 10 a cylindrical hollow member of metal, preferably formed from tubular stock, having a relatively thin wall. At the lower end of this member 10 are formed cutting teeth 12 of usual or conventional form. At the opposite end of the member 10 is a head 14 formed of one or more members and suitably attached rigidly to the member 10 as by suitable small pins. At its upper end means of attachment such as a shank 16 may be provided for connecting rotating means for the tool.

Centrally mounted within the head 14 is a twist drill 18 attached as by means of a set screw 20 to the head 14. By means of this central drill 18 a small hole is bored in advance of the hole cut by the annular series of teeth 12. The drill 18 also acts as a pilot to guide and support the trepanning tool 10 and teeth 12 during operation.

By the provision of slots 22 cut obliquely in the cylindrical wall of member 10 the chips or cuttings produced by teeth 12 are guided upwardly by rotation of the tool during its operation. The slots 22 of which there may be two or more, depending on the diameter, extend only through the intermediate portions of the cylindrical surface of member 10. As shown in Fig. 1, the cutting edges extend continuously about the lower end of the tool so that they are uninterrupted and maintained rigidly in position by the tubular portion of the body. It will be understood that the height of the cylindrical portion 10 will vary with the depth of hole to be cut and the helical slots 22 will be extended from adjacent the cutting edges 12 substantially to the point of attachment of the head 14.

In the head 14 are provided openings 24, two of which are shown in Fig. 1 diametrically opposite each other and intermediate the distance between the central axis and the periphery of the head. By means of these openings the core produced by the trepanning operation may be readily removed by the insertion of a suitable tool.

I claim:

A trepanning tool comprising a thin walled hollow cylindrical body member having a continuous row of integral uninterrupted cutting teeth extending around one end, a head secured thereto at the opposite end and having a central axially extending driving member for said tool formed thereon, said body member having spaced inclined slots formed in its cylindrical wall and extending approximately to said cutting teeth, and a central axially extending twist drill mounted within said head and extending beyond the plane of the annular cutting teeth.

ROBERT M. STARBUCK, JR.

REFERENCES CITED

The following references are of record in the file of this patent:

UNITED STATES PATENTS

| Number | Name | Date |
| --- | --- | --- |
| 505,963 | Smith | Oct. 3, 1893 |
| 958,112 | Halliwell et al. | May 17, 1910 |
| 1,855,873 | Shortell | Apr. 26, 1932 |
| 2,027,139 | Abramson et al. | Jan. 7, 1936 |

FOREIGN PATENTS

| Number | Country | Date |
| --- | --- | --- |
| 19,443 | Great Britain | Sept. 30, 1901 |